US007600105B2

(12) United States Patent
Tseng

(10) Patent No.: US 7,600,105 B2
(45) Date of Patent: Oct. 6, 2009

(54) SYSTEMS, METHODS, AND APPARATUS FOR PROVIDING EFFICIENT STARTUP TO COMPUTERS WITH PERIPHERAL DEVICES

(75) Inventor: Wei-Hsin (Johnny) Tseng, Sindian (TW)

(73) Assignee: Cyberlink Corp., Shindian, Taipei (TW)

( * ) Notice: Subject to any disclaimer, the term of this patent is extended or adjusted under 35 U.S.C. 154(b) by 346 days.

(21) Appl. No.: 10/947,494

(22) Filed: Sep. 22, 2004

(65) Prior Publication Data

US 2006/0064571 A1    Mar. 23, 2006

(51) Int. Cl.
*G06F 9/24* (2006.01)
(52) U.S. Cl. ......................................................... 713/1
(58) Field of Classification Search ...................... 713/1, 713/300
See application file for complete search history.

(56) References Cited

U.S. PATENT DOCUMENTS

| | | | | |
|---|---|---|---|---|
| 4,303,973 | A | 12/1981 | Williamson et al. | 364/103 |
| 4,398,264 | A | 8/1983 | Couper et al. | 364/900 |
| 4,497,036 | A | 1/1985 | Dunn | 364/708 |
| 4,814,972 | A | 3/1989 | Winter et al. | 364/200 |
| 4,839,802 | A | 6/1989 | Wonak et al. | 364/200 |
| 4,949,248 | A | 8/1990 | Caro | 709/203 |
| 5,086,503 | A | 2/1992 | Chung et al. | 395/700 |
| 5,181,029 | A | 1/1993 | Kim | 241/20 |
| 5,241,646 | A | 8/1993 | Arai | 710/8 |
| 5,333,273 | A | 7/1994 | Raasch et al. | 395/275 |
| 5,446,904 | A | 8/1995 | Belt et al. | 395/750 |
| 5,613,135 | A | 3/1997 | Sakai et al. | 395/800 |
| 5,666,534 | A | 9/1997 | Gilbert et al. | 395/651 |
| 5,675,390 | A | 10/1997 | Schindler et al. | 345/717 |
| 5,796,404 | A | 8/1998 | Gentner | 345/352 |
| 5,860,001 | A | 1/1999 | Cromer et al. | 395/651 |
| 5,881,318 | A | 3/1999 | Liebenow | 710/67 |
| 5,884,085 | A | 3/1999 | Sakai et al. | 395/750.01 |
| 5,900,875 | A | 5/1999 | Haitani et al. | 345/840 |

(Continued)

FOREIGN PATENT DOCUMENTS

EP        0820 022 A3    1/1998

(Continued)

OTHER PUBLICATIONS

Scott Spanbauer, Angela Freeman, Anne Kandra; "@Home Products; The Cutting Edge Couch Surfer;" PC World, Apr. 1998; pp. 245-247.

(Continued)

*Primary Examiner*—Thomas Lee
*Assistant Examiner*—Eric Chang
(74) *Attorney, Agent, or Firm*—Thomas, Kayden, Horstemeyer & Risley

(57) ABSTRACT

The present invention is broadly directed to systems and methods for providing efficient startup procedures in computer systems. One embodiment of the present disclosure provides an efficient startup procedure by implementing a streamlined boot code procedure. In this embodiment, the computer system performs normal BIOS initialization routines, but executes one of a number of different boot code sequences, based on an operational configuration selected by a user. In another embodiment, a single power key is provided, and a user selects an operational configuration using a mouse (and in response to a visual prompt displayed on the screen). In this embodiment, the system may utilize specifically customized boot code routines, or alternatively may utilize customized BIOS routines. The present invention is broadly directed to systems and methods for providing efficient startup procedures in computer systems.

9 Claims, 12 Drawing Sheets

U.S. PATENT DOCUMENTS

| | | | |
|---|---|---|---|
| 5,905,914 A | 5/1999 | Sakai et al. | 395/887 |
| 5,935,225 A | 8/1999 | Peng et al. | 710/67 |
| 5,986,586 A | 11/1999 | Tsai | 341/22 |
| 5,999,994 A | 12/1999 | Wakeland et al. | 710/38 |
| 6,108,780 A | 8/2000 | Aoki | |
| 6,111,569 A | 8/2000 | Brusky et al. | 345/717 |
| 6,137,473 A | 10/2000 | Cortopassi et al. | 345/156 |
| 6,170,024 B1 | 1/2001 | Wakeland et al. | 710/38 |
| 6,178,503 B1 | 1/2001 | Madden et al. | |
| 6,209,034 B1 | 3/2001 | Gladwin et al. | 709/227 |
| 6,230,279 B1 | 5/2001 | Dewa et al. | 713/324 |
| 6,266,714 B1 | 7/2001 | Jacobs et al. | 710/14 |
| 6,320,519 B1 | 11/2001 | Hsu et al. | 341/23 |
| 6,327,653 B1 | 12/2001 | Lee | 713/100 |
| 6,373,503 B1 | 4/2002 | Perkes | 345/718 |
| 6,414,675 B1 | 7/2002 | Shen | 345/211 |
| 6,487,611 B1 | 11/2002 | Brusky et al. | 710/10 |
| 6,487,669 B1 | 11/2002 | Waring | 713/324 |
| 6,532,499 B1 | 3/2003 | Nakamura | 710/1 |
| 6,574,517 B1 | 6/2003 | Park et al. | 700/84 |
| 6,577,326 B1 | 6/2003 | Heuvelman et al. | |
| 6,757,002 B1 | 6/2004 | Oross et al. | 345/864 |
| 6,765,788 B2 | 7/2004 | Wu | 361/680 |
| 7,039,799 B2 * | 5/2006 | Smith et al. | 713/100 |
| 7,076,646 B2 * | 7/2006 | Chang | 713/1 |
| 7,130,994 B2 * | 10/2006 | Lin et al. | 713/1 |
| 7,234,055 B2 * | 6/2007 | Chiu et al. | 713/2 |
| 7,380,148 B2 * | 5/2008 | Montero et al. | 713/324 |
| 2003/0023700 A1 | 1/2003 | Swinton et al. | 709/208 |
| 2003/0093658 A1 | 5/2003 | Wen et al. | 713/1 |
| 2003/0107271 A1 | 6/2003 | Chen | 307/46 |
| 2003/0115444 A1 | 6/2003 | Yang | 713/2 |
| 2003/0188144 A1 | 10/2003 | Du et al. | 713/1 |
| 2003/0233157 A1 | 12/2003 | Tung | 700/87 |
| 2004/0010889 A1 | 1/2004 | Chen | 16/445 |
| 2004/0012509 A1 | 1/2004 | Chen | 341/22 |
| 2004/0012918 A1 | 1/2004 | Chen | 361/683 |
| 2004/0012919 A1 | 1/2004 | Chen | 361/683 |
| 2004/0039904 A1 | 2/2004 | Lin et al. | |
| 2004/0090357 A1 | 5/2004 | Chan | 341/176 |
| 2004/0090442 A1 | 5/2004 | Chen | 345/501 |
| 2004/0090454 A1 | 5/2004 | Lo | 345/727 |
| 2004/0090738 A1 | 5/2004 | Wu | 361/680 |
| 2004/0093094 A1 | 5/2004 | Lin | 700/1 |
| 2004/0093445 A1 | 5/2004 | Wang | 710/62 |
| 2004/0093446 A1 | 5/2004 | Lin | 710/67 |
| 2004/0093449 A1 | 5/2004 | Chen | 710/100 |
| 2004/0093489 A1 | 5/2004 | Hsu | 713/2 |
| 2004/0093490 A1 | 5/2004 | Lo | 713/2 |
| 2004/0098576 A1 | 5/2004 | Chen | 713/2 |
| 2004/0109278 A1 | 6/2004 | Lee et al. | 361/143 |
| 2004/0128492 A1 | 7/2004 | Wang | 713/1 |
| 2005/0097309 A1 | 5/2005 | Chang | |

FOREIGN PATENT DOCUMENTS

| | | |
|---|---|---|
| EP | 1037133 | 9/2000 |
| EP | 1 460 536 | 3/2004 |
| JP | 2000-20285 | 1/2000 |
| WO | WO 92/21081 | 11/1992 |
| WO | WO 97/15913 | 5/1997 |
| WO | WO 98/32223 | 7/1998 |
| WO | WO 98/41918 | 9/1998 |

OTHER PUBLICATIONS

Bruce Browm; "Infinia 7200;" PC Magazine, Dec. 17, 1996; pp. 206-207.

Richard Doherty; "Living Room PC Finds Life, The;" Electronic Engineering Times. Apr. 8, 1996; pp. 80.

Michelle Campanale-Surkan; "Music Machines Serve Ear Candy for MP3 Devotees;" PC World, Jan. 2000; pp. NA.

Michael J. Himowitz; "TV on the PC? Cool! Sort of;" Fortune, Jul. 20, 1998; pp. 138.

English language translation of abstract of TW 504641.

English language translation of abstract of TW I221242.

English language translation of JP 2000-20285.

Chinese language article by Hiroshi Hayashi.

* cited by examiner

SYSTEMS, METHODS, AND APPARATUS FOR PROVIDING EFFICIENT STARTUP TO COMPUTERS WITH PERIPHERAL DEVICES

TECHNICAL FIELD

The present disclosure generally relates to computer systems and more specifically relates to methods and apparatus for providing efficient startup to computers with peripheral devices.

BACKGROUND

Computers today perform numerous functions. A computer user can check e-mail, word process, surf the Internet, play CDs and DVDs, and execute many other functions (even simultaneously). While this ability has revolutionized the computer industry, it can be a detriment to computer users. In this regard, a typical personal computer that is equipped with CD and DVD drives, attachable peripherals (e.g., USB and other devices) typically has a relatively large amount of overhead associated with the startup procedure.

At startup, a conventional computer loads the same software and drivers, performs the same system tests, and detects the same hardware, regardless of which applications the user intends to implement. A user who, for example, desires only to watch a DVD, or listen to a CD must wait just as long for the computer to boot as someone wishing to use multiple applications.

For example, if a user wishes only to view media such as a CD or DVD on a computer, the user must first turn on the computer, and allow the system to execute its general "boot" procedure. When a computer "boots-up," it generally performs system tests, initializes and detects hardware components, and loads its operating system, drivers, and other software. Once the computer has "booted-up," and the computer is stable, the user may then load the media and attempt to open an application that controls the media component (e.g., DVD player, CD player, etc.). The application is usually media software configured to convert the data on the media into audio or video that the user can perceive. The user may control playback of the media through interaction with the media software or, if present, controls on the media component itself.

Integration of a media device with a computer in this manner however, can be very slow. As stated above, once a computer is turned on, it must perform many operations to become stable. Only then is the user able to activate the desired applications. If the user is only interested in utilizing one component or application, and is uninterested in using the other computer functions, this process becomes unnecessarily time-consuming. Furthermore, an excessive amount of system resources are being expended on drivers and other overhead that are not being used. Another drawback to using a media component (such as a CD player or DVD player) during normal operation is that if the computer is running a plurality of applications, the computer can become slow and playback of the media can become choppy or distorted.

Several approaches to this problem have been developed in an effort to streamline computer operation based on intended use. One such approach involves providing a computer with a customized BIOS and separate keys for invoking operation of one of a number of attached peripheral devices. Generally, BIOS is software within a computer that tells the computer what it can do without accessing programs from a disk. As is known, a computer's BIOS is typically provided within ROM or other integrated circuits and is embedded within the computer during production. A customized BIOS refers to BIOS within a computer that is specifically coded (or customized) for specific operation.

Under one known, a customized BIOS allows the user to choose one of a plurality of operational system configurations when the computer is turned on. This allows the user to more directly access the media component if desired (without also operating unnecessary drivers or other system components). For example, a computer with such a customized BIOS checks for user input at a certain time during the startup process. If the input is not present, the computer will perform a convention startup procedure, loading all drivers that are installed on the computer. However, if the input is present, the computer will execute a streamlined portion of BIOS (which skips some of the self tests and initialization routines for certain system components that will not be required or utilized in the operational mode selected).

Practically speaking, this allows a user to turn on the computer, and then activated a "jump key." The "jump key" will command the computer to only load the specified software and drivers that allow the user to use the desired application. The normal operating system, and other components that are loaded during a normal startup will be excluded, thereby saving time.

While use of a "customized BIOS" may have certain advantages over full startup procedure, it has various disadvantages. One drawback is that, a computer's BIOS is generally embedded within the computer at production, and is not readily accessible by the user. Therefore, as a user adds components to a computer system, the original customized BIOS may not have the ability to adapt to the newly added components.

Thus, there is a need in the industry to provide computer systems and methods having efficient startup procedures, which address certain shortcomings and deficiencies that presently exist.

SUMMARY

The present invention is broadly directed to systems and methods for providing efficient startup procedures in computer systems.

One embodiment of the present disclosure provides an efficient startup procedure by implementing a streamlined boot code procedure. In this embodiment, the computer system performs normal BIOS initialization routines, but executes one of a number of different boot code sequences, based on an operational configuration selected by a user.

In another embodiment, a single power key is provided, and a user selects an operational configuration using a mouse (and in response to a visual prompt displayed on the screen). In this embodiment, the system may utilize specifically customized boot code routines, or alternatively may utilize customized BIOS routines.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure relates to a computer setup that allows a user the choice of operating in normal mode or any of a number of alternative or streamlined modes. Under normal mode, the computer will load the primary operating system (e.g., MS Windows), along with the other programs and drivers typically loaded for normal use. The alternative mode(s) may be configured to load a smaller operating system, a different operating system, or fewer applications or operating components (such as applications or device drivers). This results in a more robust and efficient computer platform.

In accordance with the scope and spirit of the invention, a variety particular embodiments may be implemented. As will be described further herein, one embodiment utilizes multiple power keys, which invoke a startup procedure that varies in accordance with the power key (or key sequence) activated. Another embodiment utilizes a single power key, and allows the user to select components that he desires to have operational in a given session. In one embodiment, a streamlined operating configuration may be implemented through the use of special boot code segments.

Figure 1:
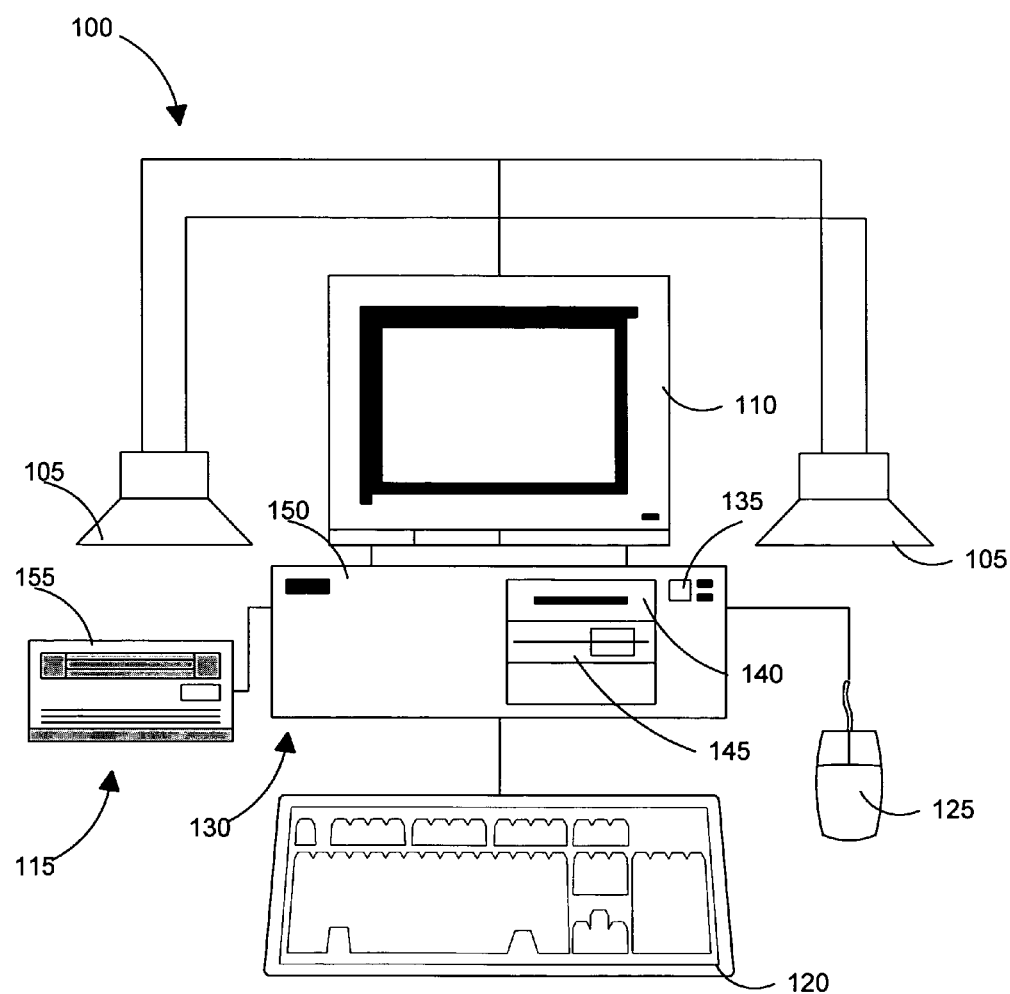
FIG. 1 is an illustration of a common computing setup with a personal computer.

Turning now to the drawings, FIG. 1 illustrates a common computer configuration 100. It comprises a computer 130 that is electrically connected to an interface 120 (shown here as a keyboard), a visual display 110, audio components 105, and a mouse 125. The computer in this illustration is also electrically connected to an external device 115 (shown here as an optical drive), and internal devices 140 and 145. As is evident to one with skill in the art, external device 115 (with interface 155) and internal devices 140 and 145 can take any of a plurality of forms, and are not limited to the representative forms or identities shown in FIG. 1. This is also true for the other components represented in FIG. 1. Also included in this illustration is power key 135, which is located on interface 150.

Figure 2:
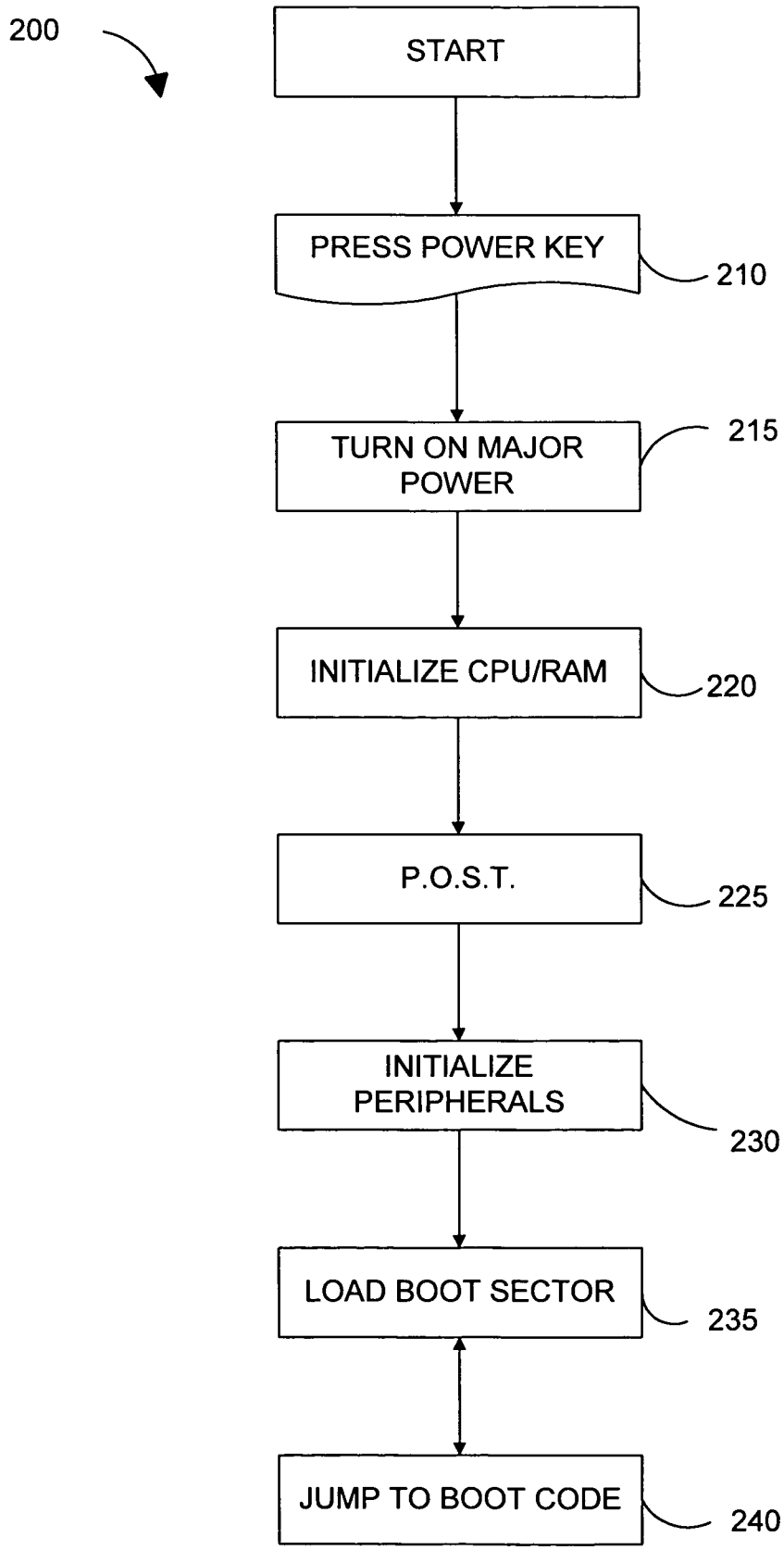
FIG. 2 is a flow chart of a general computer startup sequence.

FIG. 2 is a flowchart that illustrates a conventional procedure that is implemented when a user activates a power key 135 (FIG. 1) of a computer. Following flowchart 200, the user activates power key 210. This will turn on the computer's power 215. The computer's BIOS will then initialize the computer's CPU and RAM 220 (note that the BIOS may also initialize other functions such as the keyboard, display screen, disk drives, serial communications, etc.). Next, the BIOS conducts a Power-On Self Test (POST) 225, and initializes the peripherals 230, such as Peripheral Component Interconnect bus (PCI), Plug-and-Play components (PnP), USB devices, Advanced Configuration and Power Interface, (ACPI), Integrated Drive Electronics interface (IDE), etc. Once this is complete, the BIOS will sequentially check such devices as the Floppy drive, the DVD drive, the CD drive, Hard drive, etc. for a boot code in sector 1 of the device.

When a boot code is found (regardless of where—e.g., hard disk, CD-ROM, floppy disk, etc.), the BIOS will load the boot code from the master boot record (MBR) 235. The computer 130 loads the boot code into a predetermined address of RAM (e.g., 00007C00). Under normal operation, the computer will then load the normal operating system, drivers, and all the other software. While this sequence of operations works very well when the user desires to implement multiple computer functions, it becomes unnecessarily time-consuming (and resource consuming) when the user desires only to implement a few computer or device functions.

Figure 3:
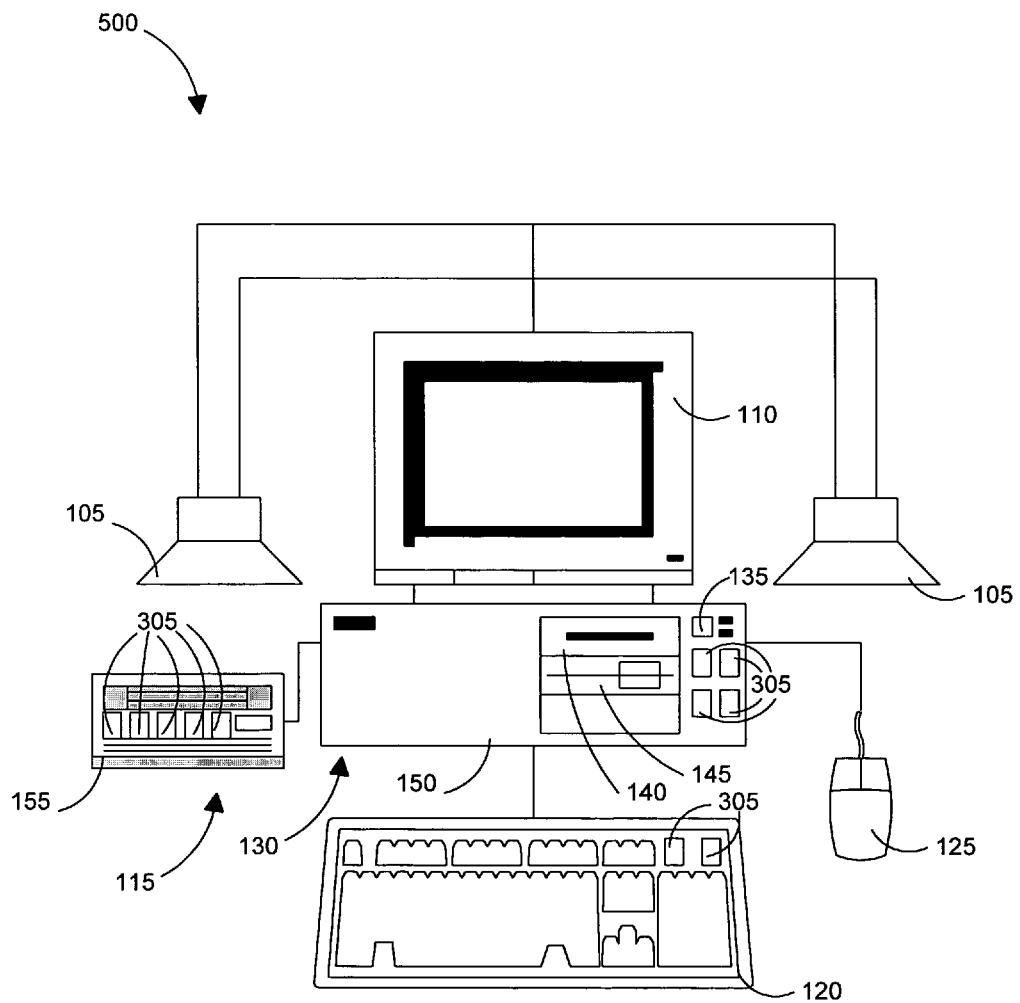
FIG. 3 is an illustration of a computing setup under one embodiment of the present disclosure.
Figure 4:
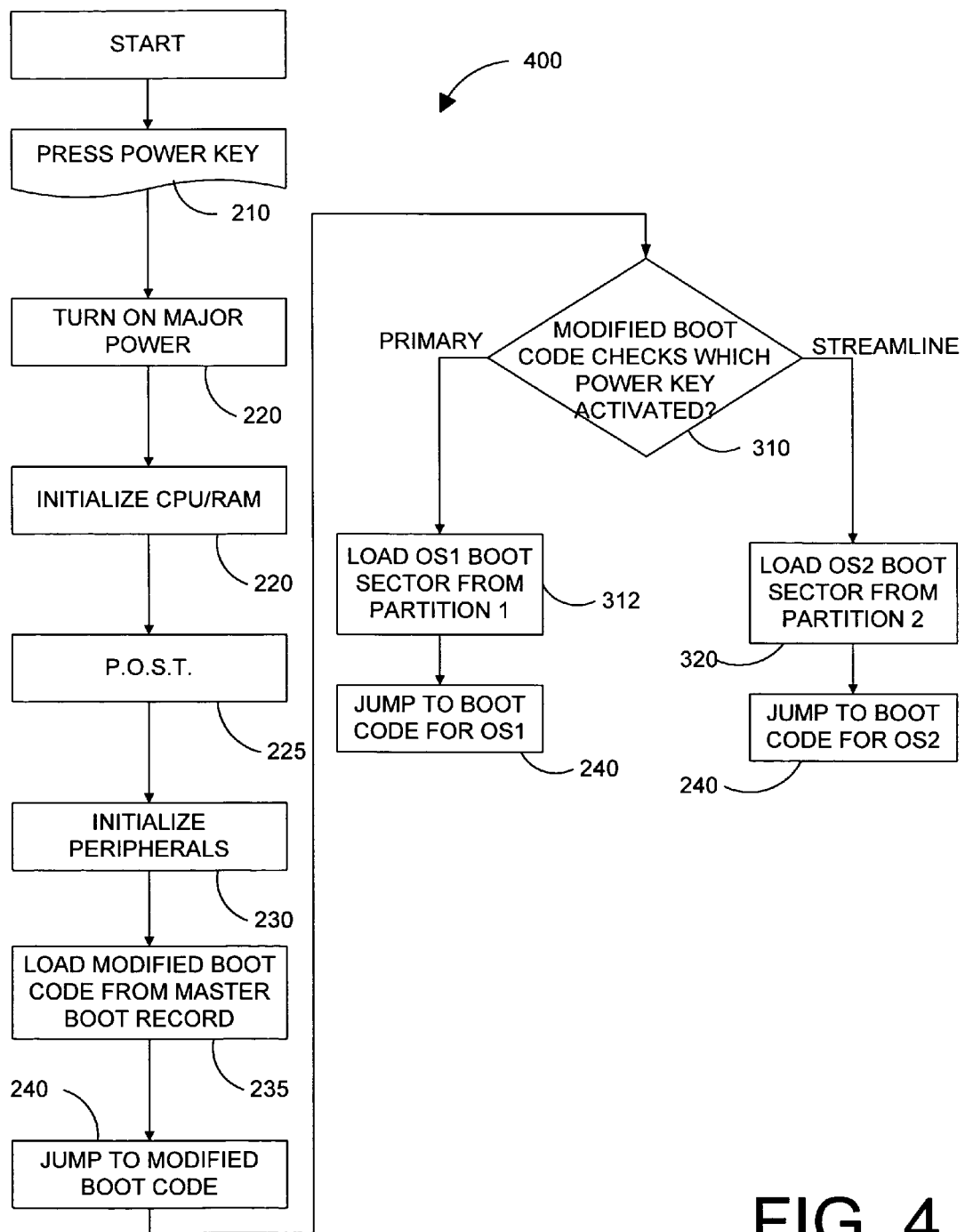
FIG. 4 is a flowchart illustrating a computer startup sequence under one embodiment of the present disclosure that may be implemented within the computer setup illustrated in FIG. 3.

Referring back to FIG. 1, in order for a user to turn on the computer's power, he simply activates (or depresses) the power key 135. After the user activated power key 135, the computer begins operation in accordance with the procedure illustrated in flowchart 200 of FIG. 2. In one embodiment of the present disclosure, illustrated in FIG. 3, the user has the option of activating any of a plurality of power keys, which can be located on an interface that is electrically connected to the computer 130. Power key 135 operates as before (shown in FIG. 1). However, streamline power keys 305 may be used to implement any of a plurality of streamlined operations, as illustrated in FIG. 4. The streamlined power keys shown in FIG. 3 are located on interfaces 120, 150, and 155. However, as is obvious to one with ordinary skill in the art, the streamlined power keys (and the power key for that matter) may be located on any interface electrically connected to the computer 130.

FIG. 4 illustrates the process that occurs by activating either power key 135 or streamline power key 305, from FIG. 3. Flowchart 400 in FIG. 4 begins identically to FIG. 2, regardless of which power key is activated. The user activates a power key 210, the major power is turned on 215, the BIOS initializes the CPU and RAM 220, runs a POST 225, initializes peripherals 230, loads modified boot code from the master boot record 235, and jumps to modified boot code 240.

At this point the modified boot code checks to determine which power key (or key sequence) was activated 310. If power key 135 was activated, the modified boot code will load the normal operating system (e.g., OS1) boot code into RAM (e.g., address 00007C00), generally located in a primary partition 312, and then the boot code will jump to address 00007C00. If, however the modified boot code check determines (310) that a power key corresponding to streamlined operation was activated, then the modified boot code loads a smaller operating system (e.g., OS2) boot code from a secondary partition into RAM address 00007C00 (320). This allows the computer to operate more efficiently.

As an example, if a user wishes to view a DVD movie through a media component, such as external device 115 (FIG. 3), he would activate the appropriate streamline power key 305. This opens a streamlined mode of operation that allows the user to view the DVD, without having to perform a general computer boot. The programs that would execute would include a streamlined operating system, a media-reading program (such as Windows Media Player, Musicmatch, Real Player, etc.), and the other appropriate programs and drivers that would allow the user to view this DVD.

Figure 5:
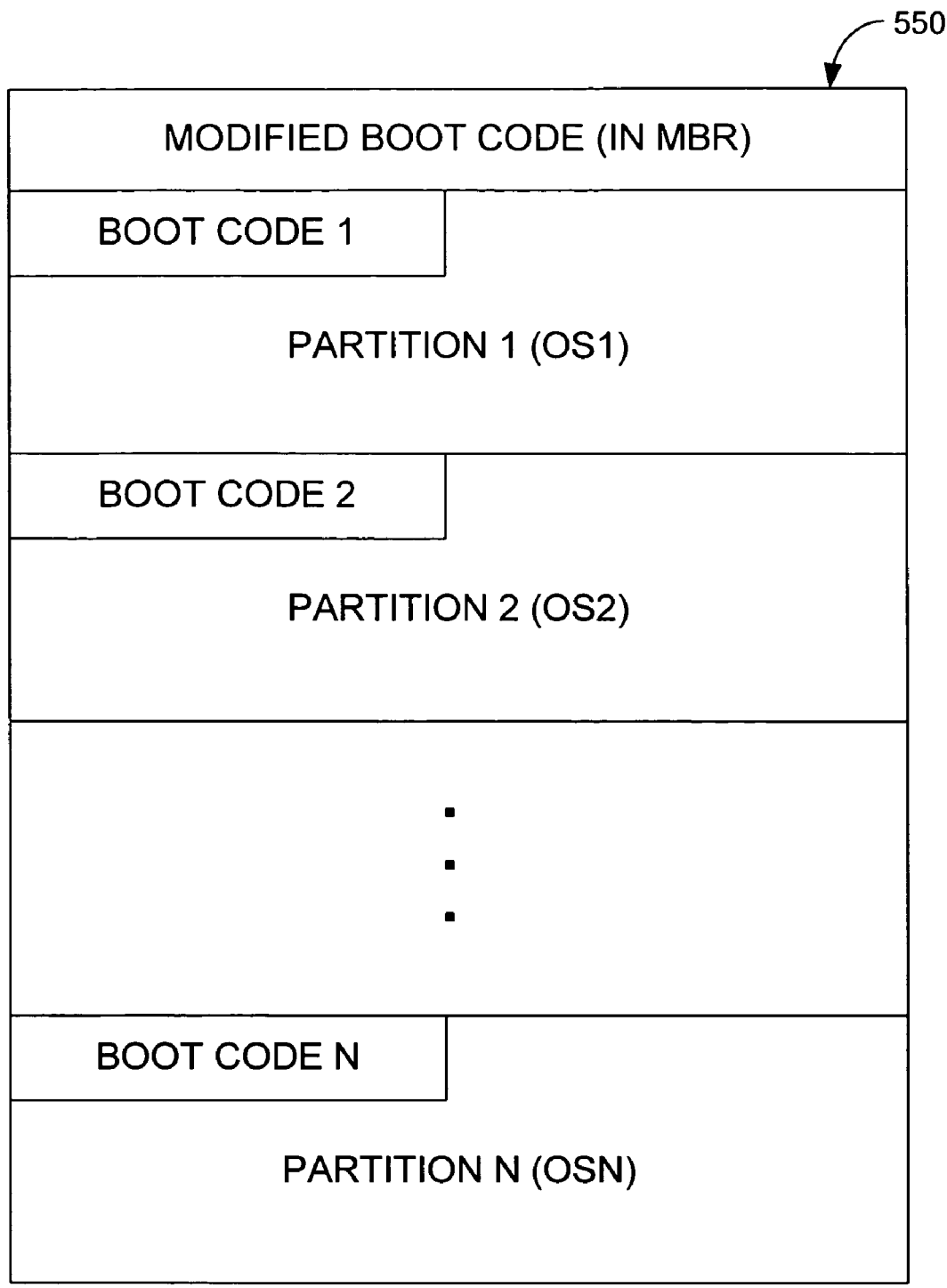
FIG. 5 is a diagram broadly illustrating certain sections or divisions of a hard drive.

Reference is now made to FIG. 5, which is a diagram broadly illustrating certain sections or subdivisions of a hard drive. In this regard, FIG. 5 illustrates a hard drive disk space 550 having multiple partitions (e.g., partition 1, 2, ... N), and each partition has an operating system associated with it (e.g., OS1, OS2, ... OSN). Generally, a boot code is provided in each partition, and the boot code defines the execution of a startup or boot procedure for the associated operating system. A master boot code is also provided, and this boot code is typically provided in the first sector of a hard disk (in an area referred to as the master boot record, or MBR). In accordance with embodiments of the present invention, this master boot code is modified, and FIG. 5 illustrates this code as a "modified boot code." Modifications made to this boot code, in accordance with embodiments of the invention, are operative to determine or ascertain the power key (or startup key sequence) that is activated, and directs the boot procedure to the appropriate boot code.

Figure 6:
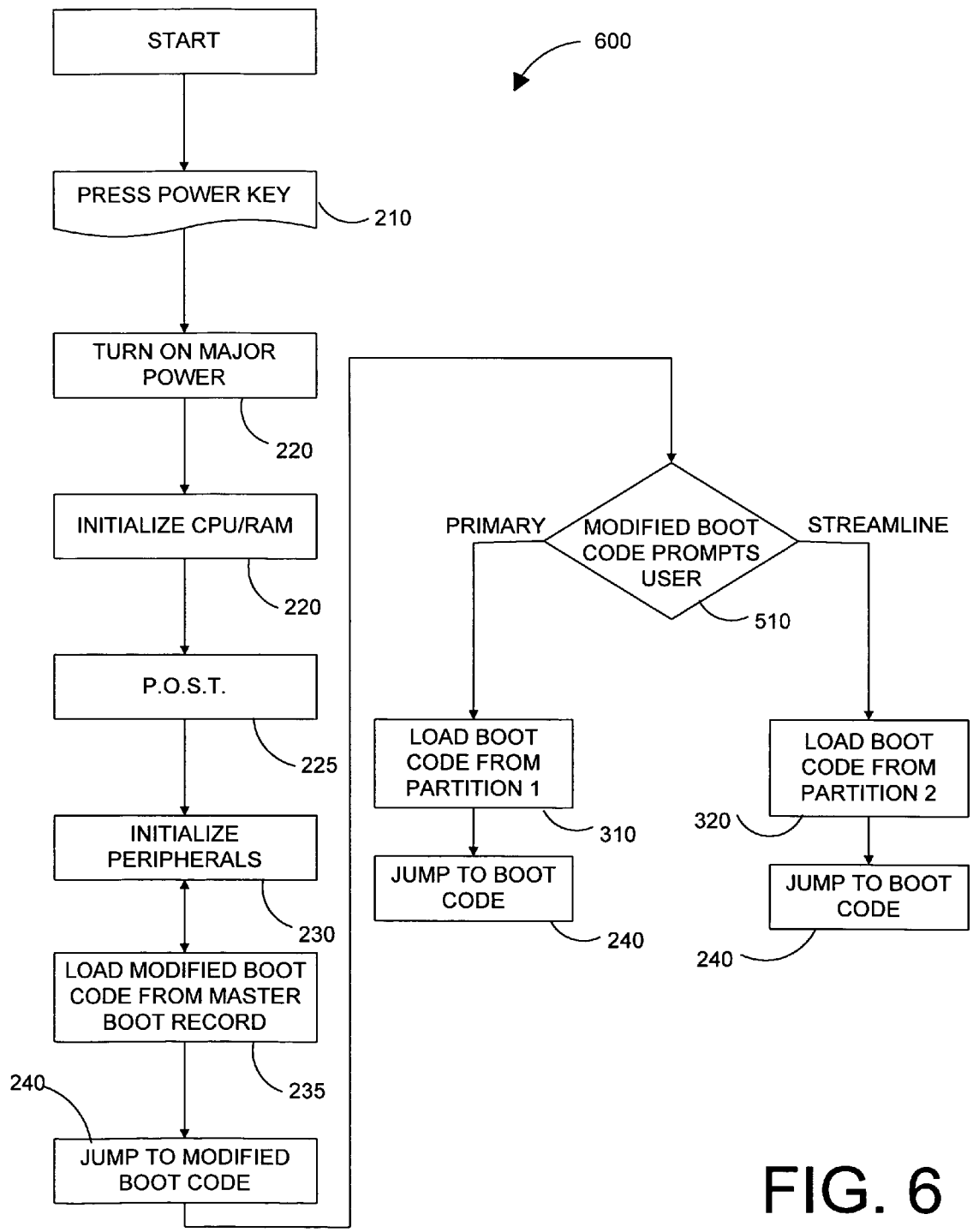
FIG. 6 is a flowchart illustrating a computer startup sequence of an embodiment of the present disclosure that may be implemented within the computer setup of FIG. 1.

Another embodiment of the present disclosure relates to a computer with only one power key, similar to the setup shown in FIG. 1. When the power key is activated, the computer will follow flowchart 600 illustrated in FIG. 6. However, after the BIOS jumps to boot code 240, the computer will prompt the user for the desired operation 510. Then, from a user prompt the user can choose whether to run the normal operation, or run any of the streamlined operations. The user prompt may take the form of a pull-down window displayed on the visual display (110 of FIGS. 1 and 3), or a number of other means for prompting the user. Once this choice is made, flowchart 600 follows the form of flowchart 500, from FIG. 4, and runs the appropriate operating system.

Figure 7:
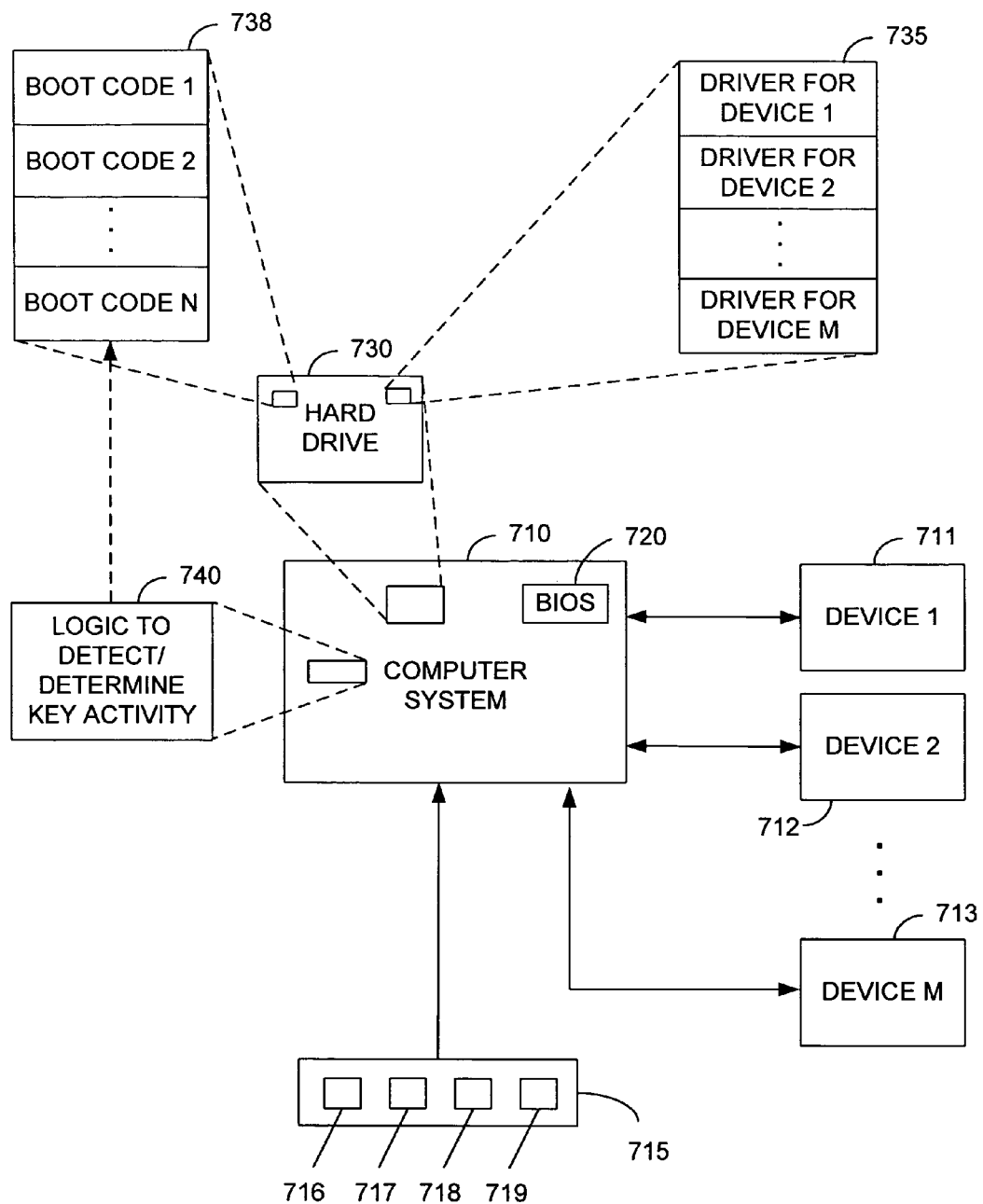
FIG. 7 is a block diagram illustrating another embodiment of the invention.

Reference is now made to FIG. 7, which is a block diagram illustrating another embodiment of the present invention. The embodiment of FIG. 7 includes a computer system 710, which may take the form of any of a number of personal computer configurations. Coupled to the computer system 710 are a plurality of devices 711, 712, 713. These devices may take on a wide variety of forms or identities, including CD players, DVD players, MP3 players, routers, printers, wireless communication hubs or access points, digital cameras, etc. In this regard, there are an ever-increasing number of devices that are adapted for connection to and intercommunication with personal computers. The devices 711, 712, 713 contemplated in this disclosure encompasses all such devices.

Also illustrated is a block 715 labeled "device activation keys." This block includes a plurality of keys or buttons 716, 717, 718, and 719, which are manually activated by a user. In one embodiment, these device activation keys 716, 717, 718, and 719, may be configured to operate as individual power keys for the individual components or devices of the system. While four such device activation keys are illustrated in FIG. 7, it should be appreciated that fewer or additional such keys may be provided, consistent with the scope and spirit of the illustrated embodiment. By way of example, device activation key 716 may be configured to operate essentially as a power key for the computer system 710. Similarly, device activation key 717 may be configured to essentially operate as a power key for device 711. Likewise, additional device activation keys may operate as power keys for the other devices coupled to the computer system 710.

In operation, if a user depresses device activation key 716, the computer system 710 may be powered up in accordance with a conventional or well-known startup procedure. In accordance with such a procedure, numerous device drivers and applications are loaded for execution and operation within the operating system of the computer system 710. If, however, a user depresses power activation key 717, then the system may be configured to power up in a different (or streamlined) configuration, such that only the device drivers and applications needed for operating device 711 are loaded for execution. If device 711 is, for example, a CD player, then the device drivers for device 711 and applications necessary for operating and communicating with device 711 and for playing audio CD's (for example) over the speakers of the computer system 710 are loaded and executed. This achieves significant time-savings for the startup procedure, and better and more efficient operational performance, as unnecessary applications and drivers need not be loaded or executed in memory.

It will be appreciated that the particular drivers and applications that are loaded for operation may vary from system to system and from device to device. What is relevant for purposes of this disclosure, and in accordance with the scope and the spirit of the illustrated embodiment, is that alternative startup configurations may be provided such that when a user desires operation out of only a limited set of devices, that the embodiment of FIG. 7 can efficiently accommodate such a request or desire.

Also illustrated in FIG. 7 are conventional components such as the BIOS 720 for the computer system 710 and a hard drive 730. Also illustrated is logic 740 that is provided to detect or determine a particular key activation sequence. This logic 740 effectively determines which of the device activation keys has been activated. In one embodiment, each activation key can correspond to an individual device 711, 712, 713. In another embodiment, key combinations or key sequences of the device activation keys can select one or more of the devices for operation. Therefore, consistent with the scope and spirit of the disclosed embodiment, a user could depress keys 717 and 718, for example, and the startup procedure for the computer system 710 may respond by loading the requisite device drivers and applications for operating device 711 and device 712. The logic 740 is provided to detect the particular activation keys that are depressed, or a particular activation key sequence that may be activated by a user.

As previously described above, conventional startup procedures for a computer system 710 include various initialization and power up self-tests that are performed by the BIOS 720. In accordance with an embodiment, multiple, independent boot code segments 738 may be provided for coordinating and implementing startup procedures for various device configurations selected by the user through the device activation keys 715. In FIG. 7, there is a dashed line between the logic 740 and boot code segments 738 indicating that the particular boot code segment(s) selected are determined in part by the logic 740. The relevant boot code segment 738, when executed, may access driver 735 and/or applications (not specifically shown) for initialization and loading into the operating systems of the computer system 710.

In one embodiment, a separate boot code segment 738 may be provided to correspond to each of the devices 711, 712, and 713. In another embodiment, there may be only two (2) boot code segments provided. The first boot code segment may be executed for powering the computer in a normal operational configuration, while a second boot code segment may be provided for specifically determining (e.g., in response to the logic 740) which drivers and applications to be loaded for the particular configuration selected by the user. It will be appreciated, consistent with the concepts and teachings herein, that other embodiments may be provided as well.

Figure 8:
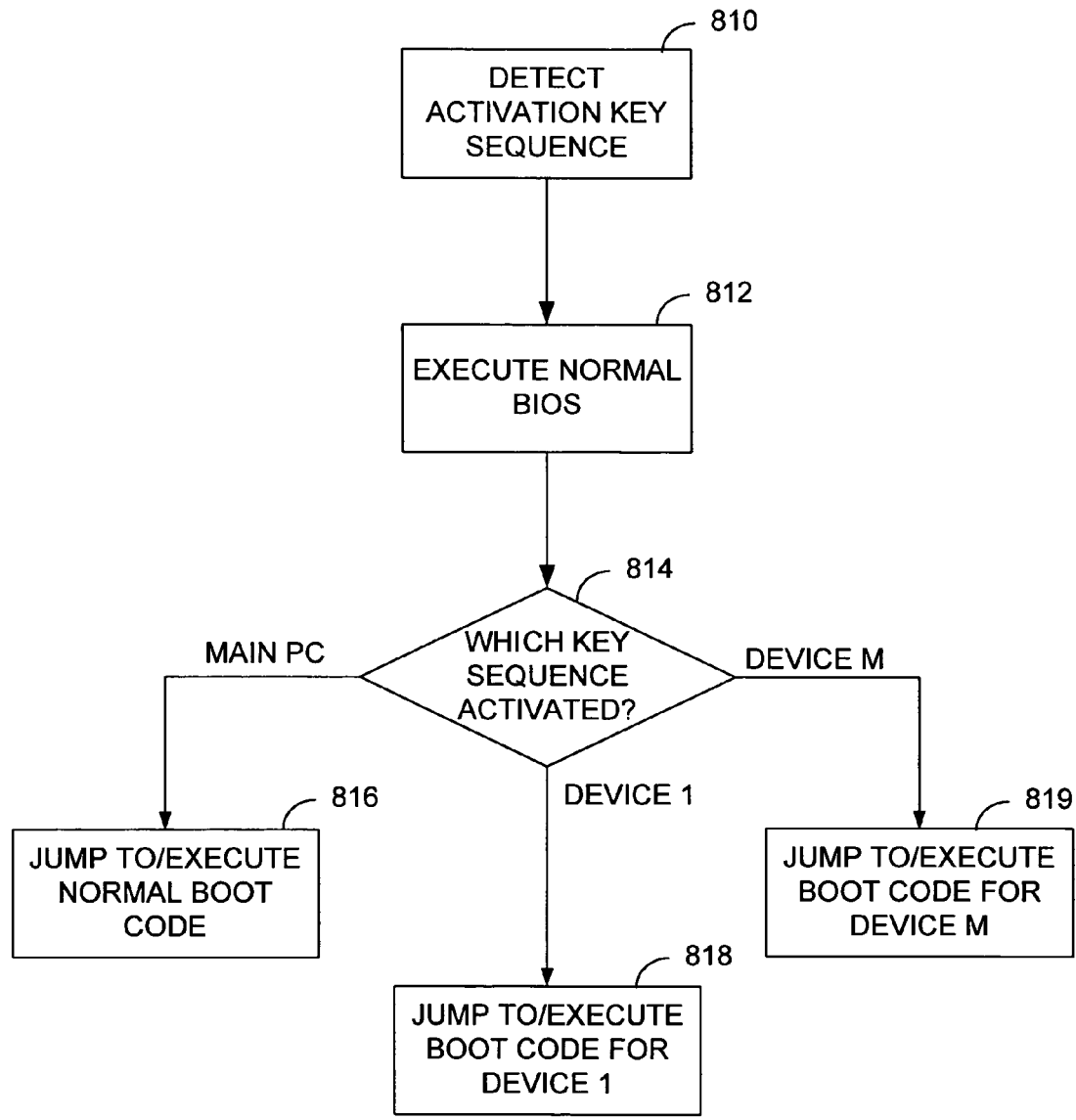
FIG. 8 is a flowchart illustrating certain operations of an embodiment of the invention.

Reference is now made to FIG. 8, which is a flow chart illustrating certain principle operational steps of an embodiment of the invention. In accordance with this embodiment, an operating method of one embodiment may detect the activation of a particular key sequence (810). Thereafter, after detection of any of a plurality of permissible key sequences, the method may execute a normal or conventional BIOS routine, during which power up and initialization operations are performed (812). Thereafter, the method may determine which key sequence, among a plurality of permissible key sequences, had been depressed or activated (814). In response to this determination, the method then proceeds to execute a corresponding boot code segment. For example, if a key sequence indicates a normal computer operational mode, then the method jumps to or executes a normal boot code segment (816). Likewise, if the method determines that a particular key activation sequence corresponds to the operation of only a single, attached device, then the method jumps to or executes a boot code segment specifically corresponding to the operation of that device (818, 819).

Figure 9:
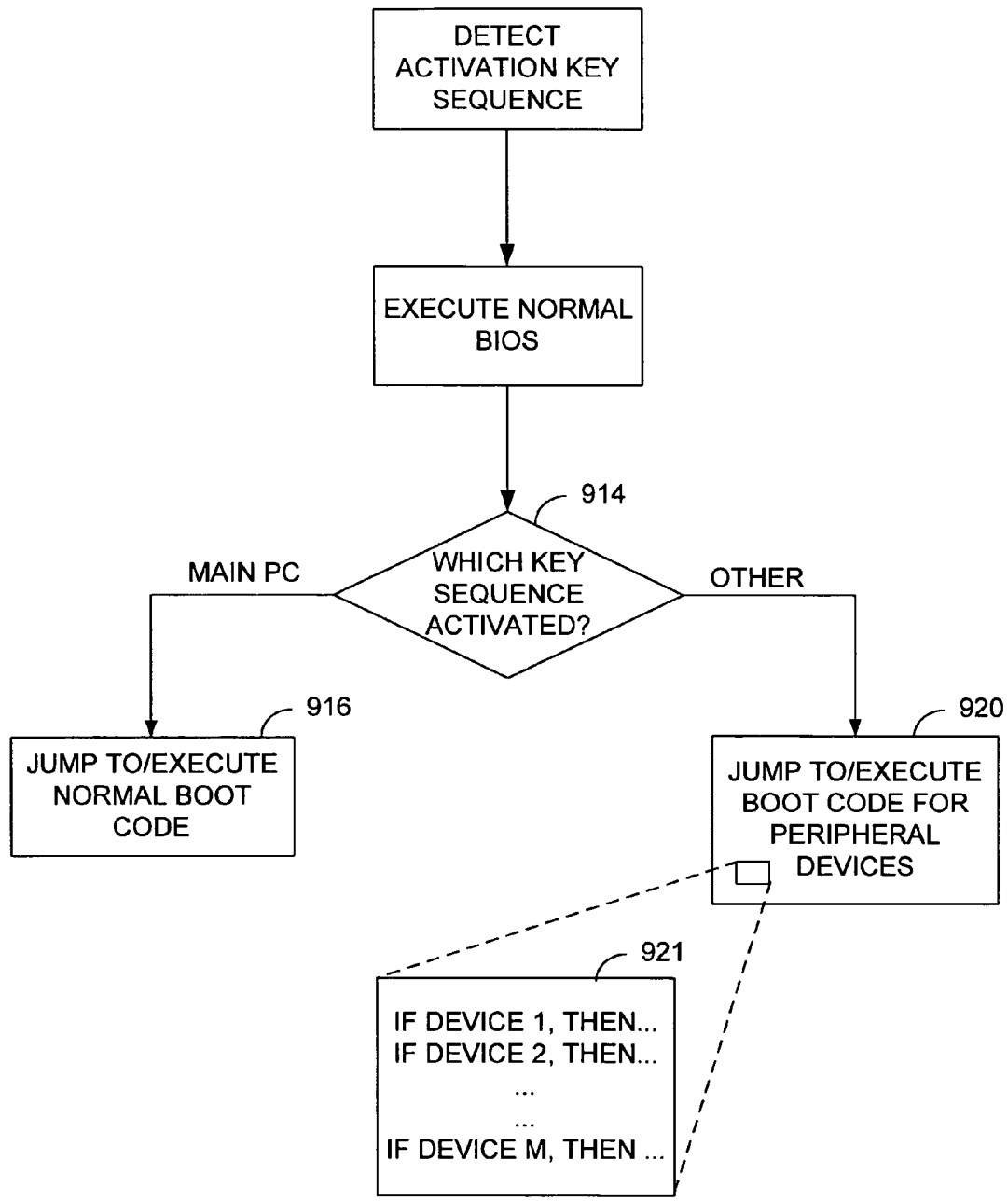
FIG. 9 is a flowchart illustrating certain operations of an embodiment of the invention.

References now made to FIG. 9, which is a flow chart illustrating a similar, but alternative embodiment of the present invention. The first two steps of the flow chart of FIG. 9 are similar to the flow chart of FIG. 8, and operate commensurately. However, in this embodiment, the method may determine either: that a key activation sequence indicates normal operation as a computer or that some other, limited configuration has been selected (914). If the method determines that a key activation sequence indicated for normal operation has been selected, then it proceeds to jump to or execute a normal boot code segment (916). If, however, the method determines that an alternative or limited operational configuration has been selected, then the method jumps to or executes a boot code segment for peripheral devices (step 920). As a part of this boot code segment for peripheral devices, the boot code itself may be configured to determine which of the plurality of devices have been selected for operation. This has been graphically illustrated in FIG. 9 using "If/Then" statements within block 921. In this regard, the boot code segment may determine that if device 1 has been selected then it executes or loads all drivers and applications appropriate for device 1. Similar If/Then statements may be executed for any and all such devices that have been selected by the user for operation. In this regard, it should be appreciated that the system may operate in a limited mode with one or more peripheral devices in operation.

Figure 10:
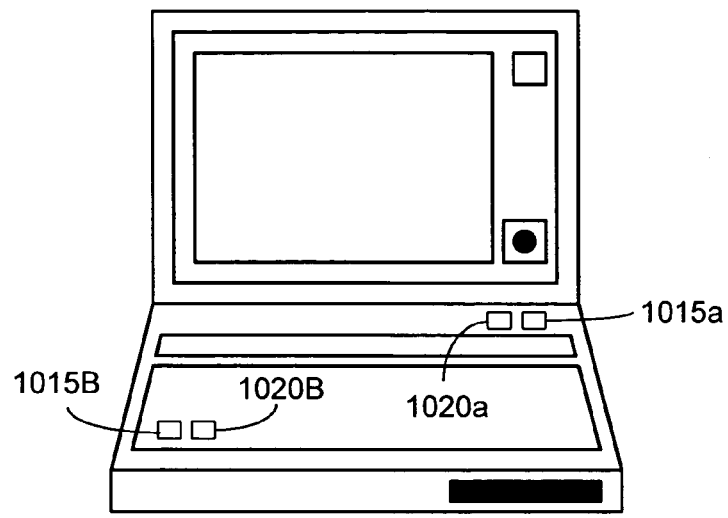
FIG. 10 is a diagram illustrating an embodiment of the invention implemented in a laptop computer.

Reference is made briefly to FIG. 10, which is provided merely to illustrate that the concepts and teachings of the present invention may be implemented on a laptop computer as well as a desktop computer. In this regard, buttons 1015 and 1020 have been illustrated and these buttons loosely correspond to the device activation keys that were illustrated in FIG. 7. These keys have been designated as both 1015a and 1020a and 1015b and 1020b to illustrate that the keys may be located either as a part of the keyboard (e.g., 1015b and 1020b) as well as in locations away from the keyboard, such as a location where conventional power keys are located (e.g., 1015a and 1020a).

Figure 11:
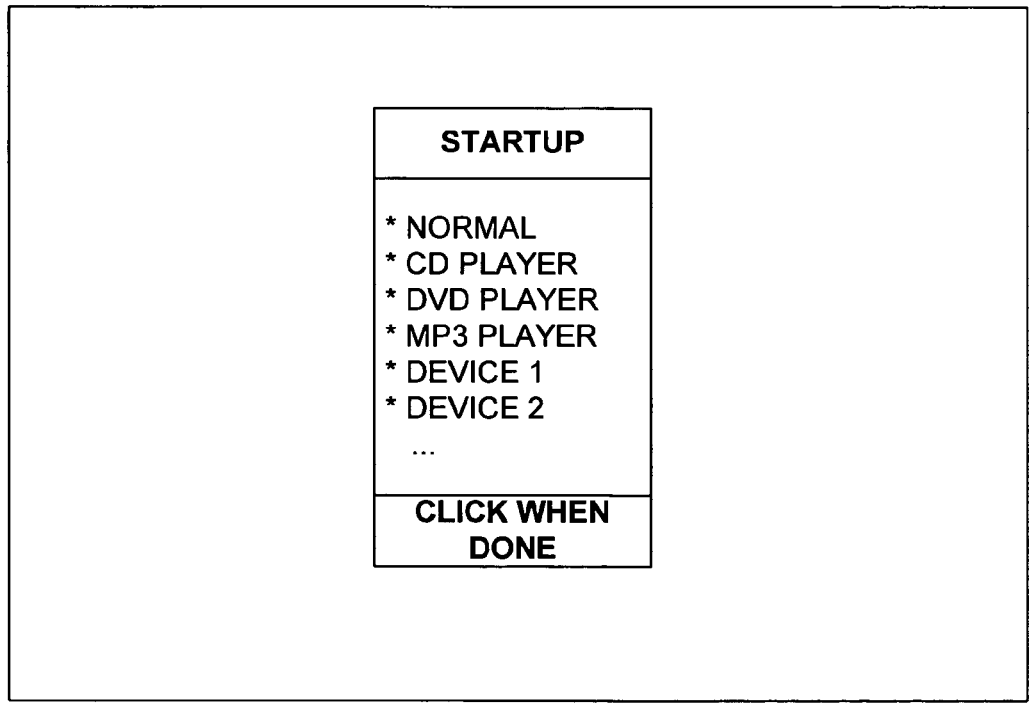
FIG. 11 is a diagram illustrating a screen display in accordance with an embodiment of the invention.

In accordance with another embodiment of the present invention, the limited or streamlined modes of operation may be provided and instructed by a user through the depression or activation of only a single power key. In such an embodiment, in response to the activation or depression of a power key, the computer is configured to present a list of options or selections to a user, who may then use a mouse or other input device (e.g., cursor or arrow keys) to select the device(s) or mode(s) of operation. FIG. 11 is provided to illustrate just one of many numerous possible screen displays that may be presented to a user to facilitate this operation. As shown in FIG. 11, after a user depresses or activates a power key, a startup menu may be presented that presents the user with a list of options or devices that the user wishes for the computer to enable for operation. In the particular embodiment illustrated, these include normal, CD player, DVD player, MP3 player, device 1, device 2, etc.

As previously mentioned, these "devices" may include or encompass a wide variety of devices that are conventional or are becoming well known for coupling in operation with personal computers. Through such a menu driven operation, a user may select any or all of the devices that the user wishes to have in operation. Although not specifically illustrated, in addition to devices, the user may also be presented with applications for operation. For example, certain applications like anti-virus software may be installed on the computer and may be configured to load each time the computer is started up. However, there may be instances where a user does not desire certain applications to load into the computer upon startup. Through such a menu driven selection of operation, a user could specifically designate which components that the user wishes to have operational for a given session with the computer. In yet another embodiment, not specifically illustrated, a user could select normal (or conventional) operation of the computer and further select components or devices that the user did not wish to have activated for that particular session. Under such a startup procedure, the computer could skip the loading or operation of devices or applications that have been selected by the user, and through otherwise normal initialization and boot process, could load the remaining applications and devices for operation.

Figure 12:
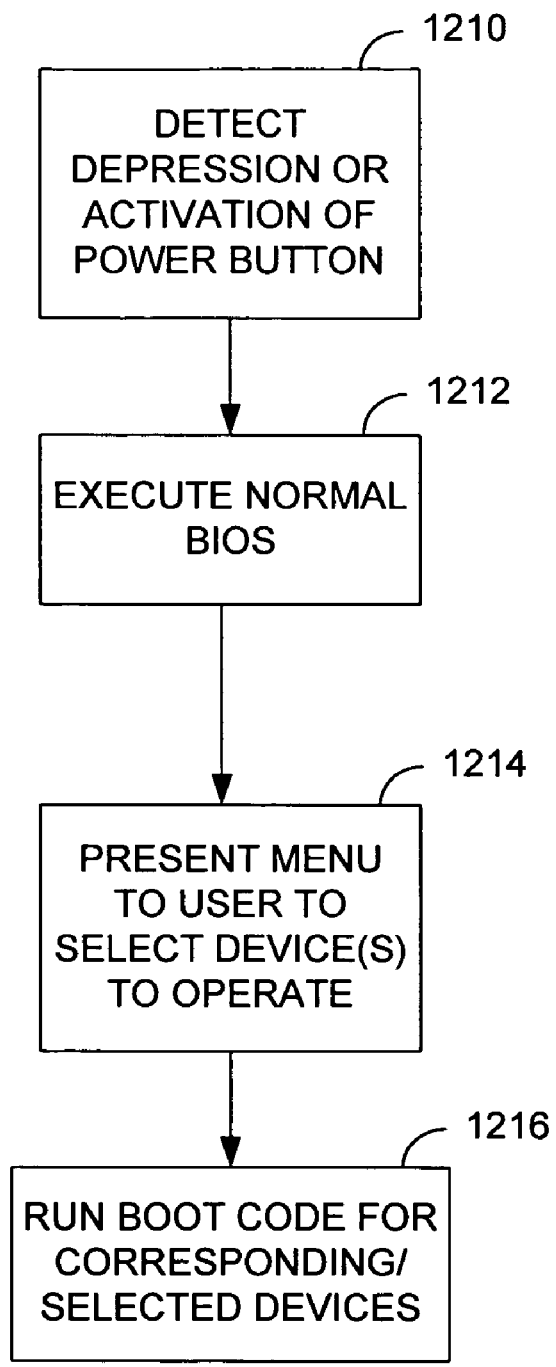
FIG. 12 is a flowchart illustrating certain operations of an embodiment of the invention.
Figure 13:
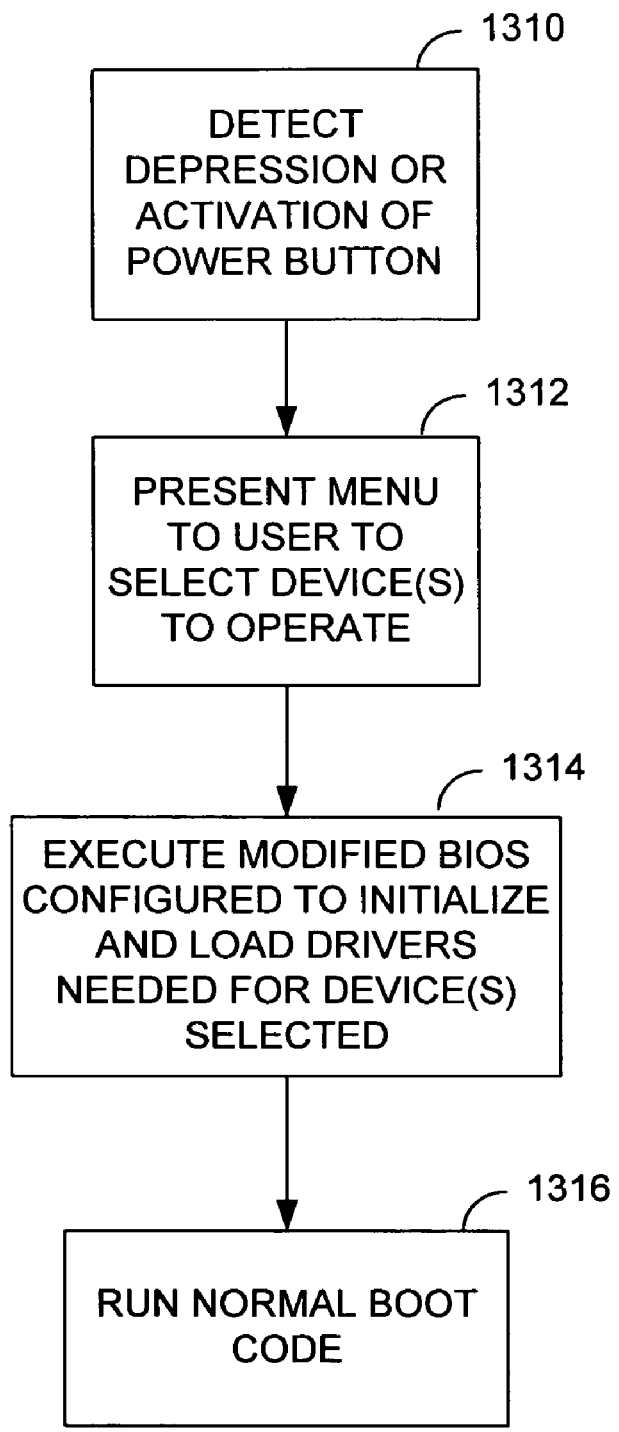
FIG. 13 is a flowchart illustrating certain operations of an embodiment of the invention.

Reference is now made to FIGS. 12 and 13, which are flow charts illustrating two (2) different embodiments for implementing the embodiments contemplated in FIG. 11. With reference first to FIG. 12, the depression or activation of a power button 1210 is detected. Thereafter, the method executes a normal or standard BIOS initialization and startup procedure (1212). After execution of the BIOS procedure, the method presents a menu (or other visual selection mechanism) to a user to allow the user to select or specify devices and applications for operation (1214). Thereafter, the method executes or jumps to boot code segments that are specifically designated in correspondence with the device or devices selected (1216). With regard to step 1216, the particular manner in which the boot code segment(s) are loaded and executed may take on any of the variety of forms previously discussed herein.

With reference to FIG. 13, the depression or activation of a power key is detected (1310). In response thereto, the user is presented with a menu or other visual mechanism that allows the user to specifically select or designate a configuration or a list of devices and applications that the user wishes to have activated or operational in the current computing session (1312). Thereafter, the method executes a modified or specialized BIOS that has been specifically configured to perform power up and initialization tests in accordance with the devices and/or applications selected for operation (1314). After execution of the modified bios, the system proceeds to execute a normal boot operation (1316).

It should be appreciated, in reference to the embodiments of the FIGS. 12 and 13, that the presentation of the menu to the user may be encompassed as a part of an enhanced BIOS or as a part of a specialized boot code segment operation. What is relevant for purposes of the illustrated embodiments is that a single power key may be provided on the computing system (as is conventional) and in response to the depression or activation of that key, a user is presented with a menu or list of configuration options that allow the user to specify a particular configuration for operation of the computer during that particular session. Such a configuration may include a limited set of applications, device drivers, etc, that are relevant or pertinent to the operation desired by the user.

As is evident to one with skill in the art, while the figures presented only give the user two choices of operating modes, this is not intended to limit the disclosure to two modes of operation. The present disclosure contemplates multiple modes of operation, implemented in a similar manner. For example, each of the streamlined power keys 305 can be configured to open a streamlined mode of operation for use with a different component or program. One key could be configured for DVD play, while another could be configured for MP3 play. Yet another could be configured for word processing. Further, in an embodiment with only one power key, the number of choices posed to the user could far exceed two, depending on the desired configuration.

It should be emphasized that many variations and modifications may be made to the above-described embodiments. All such modifications and variations are intended to be included herein within the scope of this disclosure and protected by the following claims.

Therefore, at least the following is claimed:

1. A system for performing a streamlined startup procedure for a computer comprising:
   a computer;
   a first button and a second button;
   logic responsive to activation of either the first button or second button to trigger execution of a conventional BIOS (basic input output service) routine, wherein the conventional BIOS routine comprises at least one original boot code executed and stored in a Read Only Memory (ROM);
   modified boot code stored in a hard drive, operative to determine which of the first button or second button has been activated, and to direct further execution to either of a first boot code or a second boot code;
   first boot code stored in a first partition on the hard drive, responsive to the activation of the first button to cause the computer to execute a conventional boot code procedure; and
   second boot code stored in a second partition on the hard drive, responsive to the activation of the second button to cause the computer to execute a streamlined boot code procedure, the streamlined boot code procedure configured to load or execute code segments other than the conventional boot code wherein storage of the modified boot code in the hard drive facilitates modification of the modified boot code,
   wherein the original boot code is configured to load the modified boot code from the hard drive.

2. The system of claim 1, wherein the first and second buttons are power buttons disposed on the computer.

3. The system of claim 1, wherein the first and second buttons are keys located on a keyboard.

4. The system of claim 1, wherein the computer is a desktop computer.

5. The system of claim 1, wherein the computer is a notebook computer.

6. The system of claim 1, further including a peripheral device connected to the computer, wherein the streamlined boot code procedure comprises code for operating the peripheral device through the computer.

7. The system of claim 1, further comprising a third button and third boot code responsive to the activation of the third button to cause the computer to execute a streamlined boot code procedure, the streamlined boot code procedure configured to load or execute code segments other than the conventional boot code procedure.

8. A method for streamlining the operation of a computer, the method comprising:
   operating an interface that is electrically connected to a computer, the interface comprising a plurality of inputs, wherein one of the inputs is a boot input configured to utilize a basic input output service (BIOS) to boot the computer according to any of a plurality of boot codes,
   wherein the plurality of boot codes includes at least a modified boot code, a first boot code and a second boot code,
   wherein the modified boot code is stored in the hard drive and operative to determine which of the inputs has been activated, and to direct further execution to either of the first boot code or the second boot code,
   wherein the first boot code is stored in a first partition on the hard drive to cause the computer to execute a conventional boot code procedure, and
   wherein the second boot code is stored in a second partition on the hard drive to execute a streamlined boot code procedure, the streamlined boot code procedure configured to load or execute code segments other than the conventional boot code; and
   operating at least one application executed from the streamlined operation,
   wherein the storage of the modified boot code facilitates modification of that at least one boot code by a user.

9. The method of claim 8, wherein the at least one application comprises media-reading software.

* * * * *